March 22, 1966 E. D. DITTO 3,241,904
OPHTHALMIC MOUNTING WITH HINGE MEMBER CONNECTED
TO EMBEDDED BASE MEMBER
Filed Aug. 23, 1961
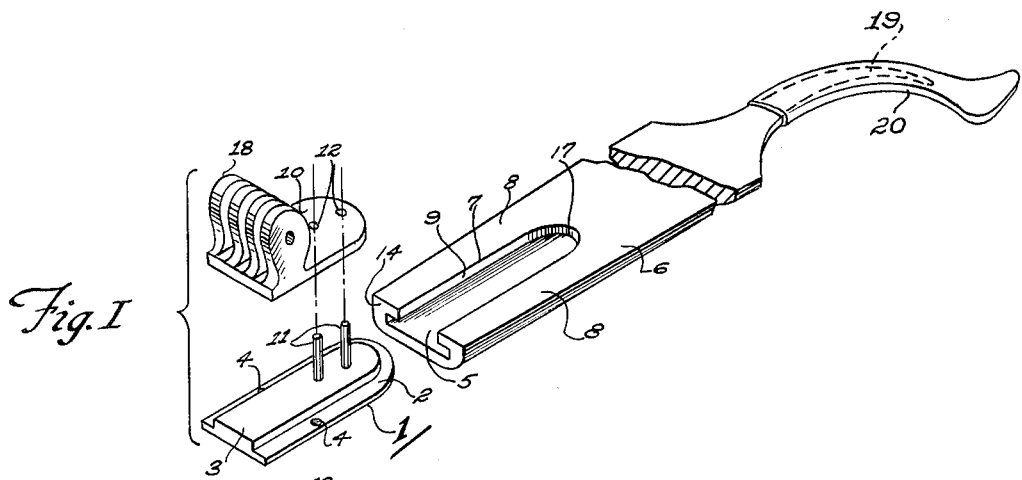
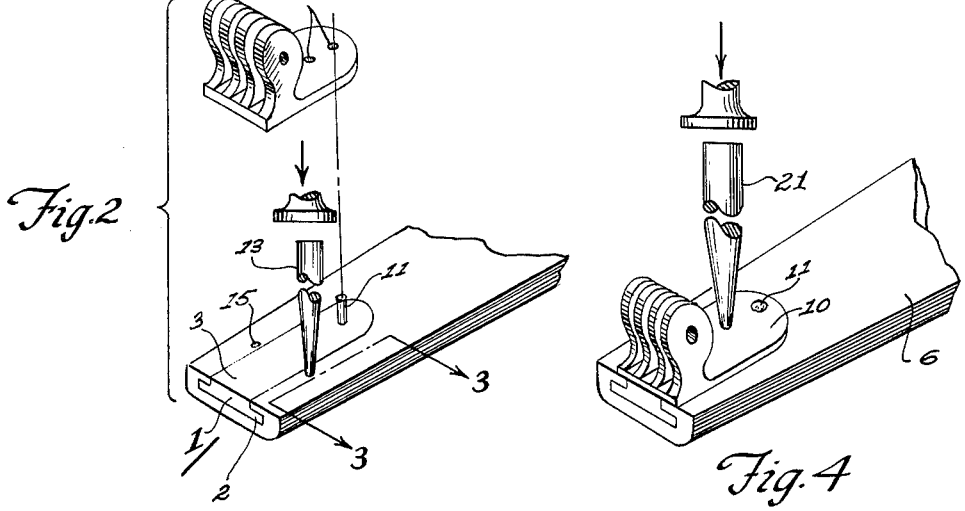
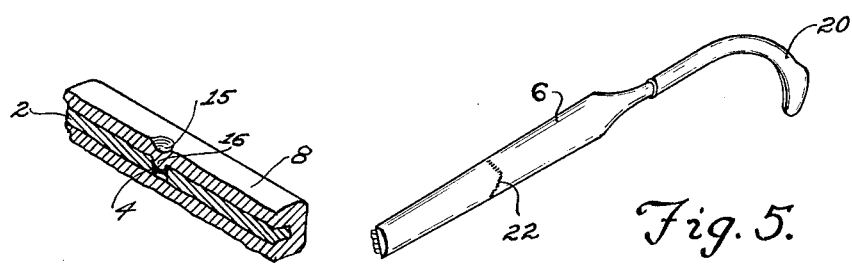
INVENTOR.
EUGENE D. DITTO
BY
Rinesard Rines
ATTORNEYS United States Patent Office 3,241,904
Patented Mar. 22, 1966

3,241,904
OPHTHALMIC MOUNTING WITH HINGE MEMBER CONNECTED TO EMBEDDED BASE MEMBER
Eugene D. Ditto, Westwood, Mass., assignor to Marine Optical Manufacturing Co., a corporation of Massachusetts
Filed Aug. 23, 1961, Ser. No. 133,395
9 Claims. (Cl. 351—121)

The present invention relates to ophthalmic mountings, and more particularly to mountings the temples of which are attached to the spectacle fronts by means of metal hinges.

The metal hinges are customarily secured to the ophthalmic-mounting fronts and the temples by means of metal pins or rivets. The ends of the rivets, however, project through the material of which the fronts and the temples are constituted, rendering them visible to a person who is observing the wearer of the ophthalmic mounting. This detracts from the beauty of the ophthalmic mounting, introducing a degree of unsightliness. A number of proposals have, accordingly, been made for reducing the source of this unsightliness. Among these proposals, for example, have been to provide the visible projecting ends of the rivets with ornamental shapes; to cover them and also the neighboring parts of the fronts and temples with ornamental plaques; and even to secure the hinges by cementing, so as to do away with the rivets altogether. None of the prior proposals, however, has been entirely satisfactory.

An object of the present invention, accordingly, is to provide a new and improved ophthalmic mounting in which, though the temples are still attached to the spectacle front by means of hinges secured by rivets or similar securing means, the securing means are, nevertheless, not visible to the observer of the wearer of the ophthalmic mounting.

The problems above described have arisen more particularly in connection with ophthalmic mountings of the non-metal type. They are not, however, restricted to mountings of this type. For a number of years, for example, though spectacle fronts and the rear ends of the temples have still been constructed of non-metal materials, the forward portions of the temples have, in many cases, been constructed of metal. There are advantages in the use of metal for this purpose. Metal is stronger than non-metal; it does not, therefore, require the use of metal reinforcing rods, such as have been used to strengthen the non-metal temples; it is possible to select metals that are of variegated colors; and, by using light metals, like aluminum, it is possible, without substantial increase in weight, to make very wide temples, compared to their thickness, thus providing wide areas to support ornamentation thereon. These are all considerations of exceeding importance to the wearer of an ophthalmic mounting who desires to present a pleasing appearance. Yet the problems above described have been particularly pressing in the case of metal temples.

Another object of the invention, therefore, is to provide a new and improved temple for an ophthalmic mounting comprising a very light-weight metal rod or bar provided at its forward end with a metal hinge that is secured thereto by rivets no traces of which, however, are visible along the outside surface of the temple; which outside surface, moreover, may be wide enough to carry ornamentation instead.

Other and further objects will be explained hereinafter, and will be particularly pointed out in the appended claims.

With the above objects in view, a feature of the invention resides in providing the hinge-attaching end portion of the ophthalmic mounting with a cavity that extends longitudinally from the front end of this end portion. The cavity is open along the inner face of the end portion to provide a communicating slot, and the slot is of width narrower than the width of the cavity to provide flanges along the sides of the cavity. A base member for supporting a hinge member is integrally provided with first and second sections, the former of which is fitted in the cavity and the latter of which is fitted in the slot substantially flush with the outer faces of the flanges, the first section being interlocked to the flanges of provide a means for preventing their separation. A hinge member is secured to and in face-to-face contact with the second section and with the outer faces of the flanges. The securing means may comprise, in addition to the interlock provided between the flanges and the first section, rivets or pins for fastening the hinge member to the base member with the flanges clamped between the hinge member and the first section. This construction is particularly adapted to the securing of the hinge member to a metal temple, since the flanges of the metal may be of considerable strength, notwithstanding that they may be quite thin, in order to render the temple quite light in weight, even though of considerable width.

The invention will now be described more fully with reference to the accompanying drawings, in which FIG. 1 is an exploded perspective, partly broken away, of parts of a temple constructed in accordance with a preferred embodiment of the invention;

FIG. 2 is a perspective similar to FIG. 1, with some of the parts assembled, showing also parts of an indenting tool;

FIG. 3 is a cross-section upon a larger scale, taken approximately upon the line 3—3 of FIG. 2, looking in the direction of the arrows;

FIG. 4 is a perspective similar to FIG. 2, showing further parts assembled; and

FIG. 5 is a perspective, upon a reduced scale, of a temple embodying the invention as seen by a person observing the wearer thereof.

A temple is shown having a cavity 5 extending longitudinally rearward from the front end 14 of a hinge-attaching forward portion 6. The cavity 5 is open along the inner face of the forward portion 6 to provide a slot 7 that communicates with the cavity 5 along a part of the length of the cavity from the front end 14 of the forward portion 6 inward. The slot 7 is of width narrower than the width of the cavity to provide side flanges 8 bounded by sides 9. The slot 7 is also shorter than the length of the cavity to provide an end flange, continuous with the side flanges 8, along its inner end 17.

A base member 1 has a first section 2 fitted in the cavity 5 and a second section 3, integral therewith, fitted in the slot 7. The second section 3 is substantially flush with the outer faces of the flanges 8. The first section 2 may be interlocked with the flanges 8, as, for example, by means of a plurality of projections 16 of the flanges 8 entering into a plurality of perforations 4 of the first section 2. The projections 16 may be formed simultaneously with their entry into the perforations 4 by the use, for example, of a tool 13, which, of course, produces also indentations 15 in the flanges 8.

A hinge member 10, which may be of standard construction, with the customary knuckles 18, may be secured in face-to-face contact with the second section 3 and with the outer faces of the flanges 8. The illustrated securing means may comprise metal pins or rivets 11 that may be integral with or otherwise secured to the second section 3. The pins or rivets 11 may be received by perforations 12 of the hinge member 10, after which they may be headed over, as by the use of a tool 21. The flanges become thus clamped between the first section 2 and the hinge member 10.

The hinge member 10 becomes thus secured to the end portion 6 of the temple, without exposing the rivet heads to the outside of the temple.

The temple may comprise a solid rod or bar of metal the forward end portion 6 of which is quite thin compared to its width, the upper and lower sides of the forward end portion 6 tapering increasingly longitudinally from its front end 14 for a relatively large portion of its length toward its rear end, thereafter tapering decreasingly longitudinally and, as shown at 19, terminating in a relatively very narrow terminal rear portion. This terminal rear portion 19 may be received in a non-metal terminal portion 20, designed to engage behind the ear or against the skull of the wearer of the ophthalmic mounting. If made of a light metal, like aluminum, the temple may be of considerable width, compared to its thickness, without substantially increasing its weight, thus permitting of ornamentation, represented at 22, upon its outer surface. Being of metal, it requires no reinforcement as is the case with temples made of non-metal materials, and the metal may be colored, as desired. There is no difficulty about milling out or otherwise fashioning the cavity 5 and the slot 7, or of inserting the base member 1 therein.

The problems of the industry above described are very well solved by the present invention, producing an ophthalmic mounting having a very pleasing appearance without any unsightliness produced by visible projecting ends of the rivets or pins.

Modifications will occur to persons skilled in the art and all such are considered to fall within the spirit and scope of the present invention, as defined in the appended claims.

What is claimed is:

1. An ophthalmic mounting having a hinge-attaching end portion and a cavity extending longitudinally from the front end of the end portion, the cavity being open along the inner face of the end portion to provide a slot communicating with the cavity, the slot being of width narrower than the width of the cavity to provide flanges along the sides of the cavity, a base member having a first section fitted in the cavity and a second section integral therewith fitted in the slot substantially flush with the outer faces of the flanges, means interlocking the first section and the flanges, a hinge member mounted in face-to-face contact with the second section and with the outer faces of the flanges, and means for securing the hinge member to the base member and for clamping the flange between the first section and the hinge member.

2. An ophthalmic mounting having a hinge-attaching end portion and a cavity extending longitudinally from the front end of the end portion, the cavity being open along the inner face of the end portion to provide a slot communicating with the cavity, the slot being of width narrower than the width of the cavity to provide flanges along the sides of the cavity, a base member having a first section fitted in the cavity and a second section integral therewith fitted in the slot substantially flush with the outer faces of the flanges, the first section being provided with a perforation, the flanges having a portion projecting into the perforation, and a perforated hinge member mounted in face-to-face contact with the second section and with the outer faces of the flanges, the second section being integrally provided with a pin received within the perforation of the hinge member, and the pin being headed over against the hinge member to secure the hinge member to the base member and to clamp the flanges between the first section and the hinge member.

3. A temple comprising a bar of metal having a hinge-attaching forward portion and a terminal rear portion, the forward portion having a cavity extending longitudinally rearward from the front end thereof, the cavity being open along the inner face of the forward portion to provide a slot communicating with the cavity, the slot being of width narrower than the width of the cavity to provide flanges along the sides of the cavity, a base member having a first section fitted in the cavity and a second integral therewith fitted in the slot substantially flush with the outer faces of the flanges, means interlocking the first section and the flanges, a hinge member mounted in face-to-face contact with the second section and with the outer faces of the flanges, means for securing the hinge member to the base member and for clamping the flanges between the first section and the hinge member, and a non-metal terminal portion enclosing the terminal rear portion of the bar.

4. A temple comprising a bar of metal having a hinge-attaching forward portion and a terminal rear portion, the forward portion having a cavity extending longitudinally rearward from the front end thereof, the cavity being open along the inner face of the forward portion to provide a slot communicating with the cavity, the slot being of width narrower than the width of the cavity to provide flanges along the sides of the cavity, a base member having a first section fitted in the cavity and a second section integral therewith fitted in the slot substantially flush with the outer faces of the flanges, means interlocking the first section and the flanges, a hinge member mounted in face-to-face contact with the second section and with the outer faces of the flanges, and means for securing the hinge member to the base member and for clamping the flanges between the first section and the hinge member, the forward portion of the bar being wide compared to its thickness to provide a wide area for ornamental purposes.

5. A temple comprising a solid bar of metal having a hinge-attaching forward portion that is thin compared to its width and the upper and lower sides of which taper increasingly longitudinally from its front end for a relatively large portion of its length toward its rear end and which thereafter taper decreasingly longitudinally, the said forward portion terminating in a relatively very narrow terminal rear portion, the foward portion having a cavity extending longitudinally rearward from the front end thereof, the cavity being open along the inner face of the forward portion to provide a slot communicating with the cavity, the slot being of width narrower than the width of the cavity to provide flanges along the sides of the cavity, a base member having a first section fitted in the cavity and a second section integral therewith fitted in the slot substantially flush with the outer faces of the flanges, the first section being provided with a perforation, the flanges having a portion projecting into the perforation, a hinge member mounted in face-to-face contact with the second section and with the outer faces of the flanges, means for securing the hinge member to the base member and for clamping the flanges between the first section and the hinge member, and a non-metal terminal portion enclosing the terminal rear portion of the bar.

6. A temple comprising a solid bar of metal having a hinge-attaching forward portion and a terminal rear portion, the forward portion having a cavity extending longitudinally rearward from the front end thereof, the cavity being open along the inner face of the forward portion to provide a slot communicating with the cavity, the slot being of width narrower than the width of the cavity and shorter than the length of the cavity to provide continuous flanges along the sides and inner end of the cavity, a base member having a first section fitted in the cavity and a second section integral therewith fitted in the slot substantially flush with the outer faces of the flanges, the first section being provided with perforations, the flanges having portions projecting into the perforations, and a perforated hinge member mounted in face-to-face contact with the second section and with the outer faces of the flanges, the second section being provided with a plurality of pins received within the perforations of the hinge member, and the pins being headed over against the hinge member to secure the hinge member to the base member and to clamp the flanges between the first section and the hinge member.

7. A temple comprising a solid bar of metal having a hinge-attaching forward portion that is thin compared to its width and the upper and lower sides of which taper increasingly longitudinally from its front end for a relatively large portion of its length toward its rear end and which thereafter taper decreasingly longitudinally, the said forward portion terminating in a relatively very narrow terminal rear portion, the forward portion having a cavity extending longitudinally rearward from the front end thereof, the cavity being open along the inner face of the forward portion to provide a slot communicating with the cavity, the slot being of width narrower than the width of the cavity to provide flanges along the sides of the cavity, a base member having a first section fitted in the cavity and a second section integral therewith fitted in the slot substantially flush with the outer faces of the flanges, the first section being provided with a perforation, the flanges having a portion projecting into the perforation, and a perforated hinge member mounted in face-to-face contact with the second section and with the outer faces of the flanges, the second section being integrally provided with a pin received within the perforation of the hinge member, the pin being headed over against the hinge member to secure the hinge member to the base member and to clamp the flanges between the first section and the hinge member.

8. A temple comprising a bar having a hinge-attaching forward portion that is thin compared to its width and the upper and lower sides of which taper increasingly longitudinally from its front end for a relatively large portion of its length toward its rear end and which thereafter taper decreasingly longitudinally, the said forward portion terminating in a relatively very narrow terminal rear portion, the forward portion having a cavity extending longitudinally rearward from the front end thereof, the cavity being open along the inner face of the forward portion to provide a slot communicating with the cavity, the slot being of width narrower than the width of the cavity to provide flanges along the sides of the cavity, a base member having a first section fitted in the cavity and a second section integral therewith fitted in the slot substantially flush with the outer faces of the flanges, means interlocking the first section and the flanges, a hinge member mounted in face-to-face contact with the second section and with the outer faces of the flanges, and means for securing the hinge member to the base member and for clamping the flanges between the first section and the hinge member.

9. A temple having a hinge-attaching end portion and a cavity extending longitudinally rearward from the front end thereof, the cavity being open along the inner face of the forward portion to provide a slot communicating with the cavity, the slot being of width narrower than the width of the cavity to provide flanges along the sides of the cavity, a base member having a first section fitted in the cavity and a second section integral therewith fitted in the slot substantially flush with the outer faces of the flanges, means interlocking the first section and the flanges, a hinge member mounted in face-to-face contact with the second section and with the outer faces of the flanges, and means for securing the hinge member to the base member and for clamping the flanges between the first section and the hinge member.

References Cited by the Examiner
UNITED STATES PATENTS

| | | | |
|---|---|---|---|
| 1,582,898 | 5/1926 | Bobrow | 88—53 |
| 2,443,249 | 6/1948 | Jackson | 88—52 |
| 2,693,132 | 11/1954 | Belgard | 88—53 |
| 2,803,994 | 8/1957 | DeAngelis et al. | 88—53 |
| 2,949,638 | 8/1960 | Butler. | |
| 3,052,159 | 9/1962 | Gross et al. | 88—53 |

FOREIGN PATENTS

| | | |
|---|---|---|
| 870,078 | 12/1941 | France. |
| 858,988 | 1/1961 | Great Britain. |
| 868,008 | 5/1961 | Great Britain. |

DAVID H. RUBIN, *Primary Examiner.*

WILLIAM MISIEK, *Examiner.*